3,156,691
PRODUCTION OF 2-AMINOPYRIMIDINE
Heinrich Pasedach, Ludwigshafen (Rhine), Germany, assignor to Badische Anilin- & Soda-Fabrik Aktiengesellschaft
No Drawing. Filed Jan. 15, 1962, Ser. No. 166,414
Claims priority, application Germany Jan. 18, 1961
4 Claims. (Cl. 260—256.4)

This invention relates to a new and very economical process for the production of 2-aminopyrimidine.

It is known that 2-aminopyrimidine, which is important as an intermediate for chemotherapeutics, can be prepared by condensation of guanidine with compounds derived from propargylaldehyde. Thus for example guanidine or derivatives thereof have been reacted in strongly acid media with propargylaldehyde diacetal (U.S. patent specification No. 2,455,172, German patent specification No. 889,445 and French patent specification No. 896,889), with β-alkoxyacrolein diacetal (U.S. patent specification No. 2,375,735), with malonodialdehyde or its acetals (French patent specification No. 886,084 and German patent specification No. 971,656) and with β-aminoacroleins (U.S. patent specification No. 2,778,821). All these methods, in which as a rule good yields are obtained, have the disadvantage that the said propargylaldehyde derivatives must be prepared in a separate process stage, usually with considerable loss of yield (see for example U.S. patent specification No. 2,879,305 relating to the production of acetals of propargylaldehyde).

Attempts have been made to prepare 2-aminopyrimidine starting direct from propargylaldehyde (French patent specification No. 896,889, Example 3, and German patent specification No. 889,445, Examples 1, 3, 4, 5 and 6). According to French patent specification No. 896,889, however, the yield of 2-aminopyrimidine is only 38% of the theory, and by repeating Example 1 of the said German patent specification yields of only about 30% are obtained. These poor yields are attributable to the great sensitivity of propargylaldehyde which under the conditions specified in Germany patent specification No. 889,445 resinifies substantially. Since resinfied by products complicate processing, the above-mentioned more stable derivatives of propargylaldehyde have hitherto been used technically for the production of 2-aminopyrimidine in spite of the fact that this involves an additional process stage.

I have now found that 2-aminopyrimidine can be obtained in practically quantitative yields under simple reaction conditions from guanidine and propargylaldehyde in aqueous hydrochloric acid solution by reacting propargylaldehyde, advantageously with vigorous agitation, with a concentrated hydrochloric acid of which the hydrogen chloride content is at least one mole equivalent with reference to the amount of propargylaldehyde, at temperatures between —10° C. and +100° C., preferably between 0° C. and 40° C., and allowing the reaction product to react with guanidine or a salt thereof at temperatures between —10° C. and +100° C., if desired in the presence of a condensing agent besides the said hydrochloric acid, for example hydrogen chloride or sulfuric acid.

Guanidine salts are known in the art, and the expert will gather from a study of the instant specification that salts of inorganic acids such as the carbonate, hydrochloride, hydrobromide, sulfate, nitrate and phosphate are usually readily available and inexpensive, so that their use appears desirable from an economic point of view. Preferred salts for the process of this invention are the hydrochloride, nitrate and sulfate. Preferred condensing agents include strong mineral acids, such as hydrogen chloride, hydrogen bromide, and sulfuric acid which can be used owing to their influence on reactions which take place by condensation, i.e. elimination of water between two molecules of the reactants.

The process for the production of 2-aminopyrimidine according to this invention is advantageously carried out by introducing propargylaldehyde, which may be dissolved in an organic solvent or in water, with vigorous stirring, advantageously at between 0° C. and 40° C., into concentrated aqueous hydrochloric acid, which may additionally be saturated with hydrogen chloride gas, introduction being in such a way that the propargylaldehyde is kept out of contact with atmosphereic oxygen as far as possible. Within reasonable technical limits, the concentration of the propargylaldehyde in the solvent or water is without appreciable effect on the success of the process. The content of hydrogen chloride during this reaction is preferably between one and six moles per mole of propargylaldehyde. The higher the concentration of the hydrogen chloride in the hydrochloric acid, the smoother the reaction and the higher the yields. The hydrochloric acid should therefore contain at least 20% by weight of hydrogen chloride; it is usual however, to use solutions of hydrogen chloride which are saturated at the reaction temperature. These saturation concentrations are between about 35 and 45% by weight; they may be increased if the reaction is carried out under pressure. If it is desired to work at higher temperatures, it is advantageous to lead the propargylaldehyde into the hydrochloric acid in the gaseous phase, if desired in admixture with an inert gas, such as nitrogen, with vigorous stirring. Undesirable side reactions are prevented under these reaction conditions and a pale yellowish solution of formed almost instantaneously which no longer has the odor of propargylaldehyde. Guanidine, either in free form or in the the form of a salt, with or without a condensing agent, as for example hydrobromic acid or sulfuric acid or additional hydrogen chloride, is then added to the reaction medium. The reaction mixture is kept at room temperature for some time, e.g. about 1 to 4 hours or more, and then, if desired until completion of the reaction, heated to temperatures between 40° C. and 100° C. After the reaction has been completed, the reaction mixture is made alkaline and 2-aminopyrimidine isolated in the usual way, for example by extraction with isobutanol. The above-mentioned reaction conditions can be varied in many ways, as will be obvious to those skilled in the art upon reading the instant specification, without deviating from the scope of the invention. Thus it is possible to react the guanidine in the reaction mixture at room temperature with or without stirring and for a period which ensured the desired yield.

Other embodiments of the process according to this invention comprise for example preparing a mixture of propargylaldehyde and guanidine or a guanidine salt and then adding hydrochloric acid or introducing a suspension of a guanidine salt in propargylaldehyde into hydrochloric acid. It is also possible to add the condensing agent, such as sulfuric acid, to the reaction medium prior to the addition of guanidine or a guanidine salt, e.g. during interaction of the propargylaldehyde and the hydrogen chloride.

At the present time it is not possible to make an exact statement as to the chemistry of the reaction according to this invention. It may be assumed that a propargylaldehyde hydrochloric acid adduct is formed in the first step in view of the fact that a strongly exothermic reaction (about 40 kcal./mole) takes place, that the pungent odor of propargylaldehyde instantaneously disappears and also that the acidic hydrogen at the triply linked carbon atom in the propargylaldehyde can no longer be detected with silver nitrate, whereas propargylaldehyde can be detected in 40% sulfuric acid under otherwise the same reaction conditions even after 12 to 15 hours. Moreover, no free β-chloroacrolein has been found to form in the reaction between hydrochloric acid and propargylaldehyde, such as is obtained from propargylaldehyde and hydrogen chloride in an anhydrous medium according to F. Brunnmüeller, thesis (Munich, 1954). β-Chloroacrolein has a pungent odor causing lachrymatory irritation and, since it is insoluble in water, would separate; neither of these phenomena can be observed however.

The course of the process according to this invention is the more surprising because it is known from the literature that propargylaldehyde decomposes in aqueous solution (Houben-Weyl, Methoden der org. Chemie, 4th edition, volume 7/1, page 178). In particular it is stated by F. Brunnmüller (ibid), at the top of page 3 that propargylaldehyde reacts with aqueous hydrochloric acid with vigorous evolution of heat and with brown discoloration. At the bottom of page 13 of the said thesis Brunnmüller states that this is a polymerization process.

The invention is illustrated by, but not limited to, the following examples in which parts are by weight.

Example 1

54 parts of propargylaldehyde is introduced in the course of half an hour into an agitated vessel charged with 372 parts of 38% hydrochloric acid while cooling well at a temperature of +2° C. to +5° C. The propargylaldehyde reacts immediately and this is shown by the disappearance of the odor of propargylaldehyde. After 105 parts of guanidine hydrochloride has been added, the reaction mixture is kept for two hours between 20° C. and 25° C. and then heated for another hour at 60° C. The reaction mixture is cooled and made alkaline with 450 parts of 50% caustic soda solution and extracted with isobutanol. Isobutanol is distilled off and then 2-aminopyrimidine is obtained in a 91% yield by distillation. Boiling point 156° C. to 158° C. at 130 mm Hg; melting point 126° C. to 127° C.

Example 2

10 parts of concentrated sulfuric acid is stirred into 186 parts of 38% aqueous hydrochloric acid cooled to 0° C. and then 54 parts of propargylaldehyde is added within forty minutes at a reaction temperature of 0° C. to +5° C. with good cooling. Then 105 parts of guanidine hydrochloride is added and the mixture is kept for two hours at 25° C. and for another hour at 40° C.

By working up as described in Example 1, including neutralization with 300 parts of 50% caustic soda solution, pure 2-aminopyrimidine is obtained in a yield of 82% of the theory.

Example 3

A suspension of 105 parts of guanidine hydrochloride in 150 parts of 38% hydrochloric acid is saturated with gaseous hydrogen chloride at between 0° C. and —5° C. Then a mixture of 54 parts of propargylaldehdye in 54 parts of isobutanol is introduced in the course of twenty minutes at +5° C. with good cooling. The mixture is kept for two hours at 25° C. and for another hour at 60° C. The mixture is neutralized with 240 parts of 50% caustic soda solution and worked up as in Example 1. 2-aminopyrimidine is obtained in a yield of 88%.

Example 4

54 parts of propargylaldehyde is introduced at 22° C. to 25° C. within an hour with good stirring into a suspension of 105 parts of guanidine hydrochloride in 372 parts of 38% hydrochloric acid. The mixture is kept at 22° C. to 25° C. for another 2½ hours and then heated to 40° C. for an hour. The mixture is neutralized with 420 parts of 50% caustic soda solution and worked up. 2-aminopyrimidine is obtained in a yield of 79%.

Example 5

10 parts of concentrated sulfuric acid and 100 parts of guanidine hydrochloride are introduced into 233 parts of 38% hydrochloric acid while stirring.

A stream of nitrogen containing 54 parts of propargylaldehyde vapor is led through this mixture for an hour at a temperature of +10° C.

To produce this vapor mixture, the stream of nitrogen is led through a supply vessel in which propargylaldehyde is heated to 40° C. to 45° C.

The mixture is neutralized with 300 parts of 50% caustic soda solution and worked up. 2-aminopyrimidine is obtained in yield of 80%.

Example 6

105 parts of guanidine hydrochloride is suspended in 186 parts of 38% hydrochloric acid. A solution of 54 parts of propargylaldehyde in 200 parts of benzene is then introduced within an hour at about +5° C. while stirring.

The mixture, in which two layers have formed, is saturated at 0° C. to +5° C. with 60 parts of hydrogen chloride and then kept for three hours at 20° C. to 25° C. The mixture is then heated for an hour at 50° C.

The mixture is neutralized with 340 parts of 50% caustic soda solution and worked up. 2-aminopyrimidine is obtained in a yield of 81%.

I claim:

1. A process for the production of 2-aminopyrimidine which comprises reacting propargylaldehyde at temperatures between —10° C. and +100° C. while mixing intensely with an aqueous hydrochloric acid solution containing from 20% by weight of hydrogen chloride to an amount of hydrogen chloride equal to the saturation point of the solution at the reaction temperature, the hydrogen chloride content of which is at least one mole equivalent with reference to the amount of propargylaldehyde and allowing the reaction mixture to react with a compound selected from the group consisting of guanidine and salts of guanidine at temperatures between —10° C. and +100° C.

2. A process for the production of 2-aminopyrimidine which comprises reacting propargylaldehyde at temperatures between —10° C. and +100° C. while mixing intensely with an aqueous hydrochloric acid solution containing from 20% by weight of hydrogen chloride to an amount of hydrogen chloride equal to the saturation point of the solution at the reaction temperature, the hydrogen chloride content of which is 3 to 6 mole equivalents with reference to the amount of propargylaldehyde and reacting the reaction mixture with at least one compound selected from the group consisting of guanidine and salt of guanidine at temperatures between —10° C. and +100° C.

3. A process for the production of 2-aminopyrimidine which comprises reacting propargylaldehdye at temperatures between —10° C. and +100° C. with intense mixing with an aqueous hydrochloric acid solution containing from 20% by weight of hydrogen chloride to an amount of hydrogen chloride equal to the saturation point of the solution at the reaction temperature, the hydrogen chloride content of which amounts to at least one mole equivalent with reference to the amount of propargylaldehyde and reacting the reaction mixture with at least one compound selected from the group consisting of guanidine and guanidine salts, with further addition of strong mineral acid as condensing agents at temperatures between —10° C. and +100° C.

4. A process for the production of 2-aminopyrimidine which comprises reacting propargylaldehyde at temperatures between —10° C. and +100° C. with intense mixing with an aqueous hydrochloric acid solution containing from 20% by weight of hydrogen chloride to an amount of hydrogen chloride equal to the saturation point of the solution at the reaction temperature, the hydrogen chloride content of which amounts to 3 to 6 mole equivalents with reference to the amount of propargylaldehyde and allowing the reaction mixture to react with at least one compound selected from the group consisting of guanidine and guanidine salts, with further addition of strong mineral acid as condensing agents at temperatures between −10° C. and +100° C.

References Cited in the file of this patent

UNITED STATES PATENTS

| | | |
|---|---|---|
| 2,455,172 | Hearne et al. | Nov. 30, 1948 |

FOREIGN PATENTS

| | | |
|---|---|---|
| 896,889 | France | Mar. 6, 1945 |
| 889,445 | Germany | Sept. 10, 1953 |